Patented Nov. 30, 1943

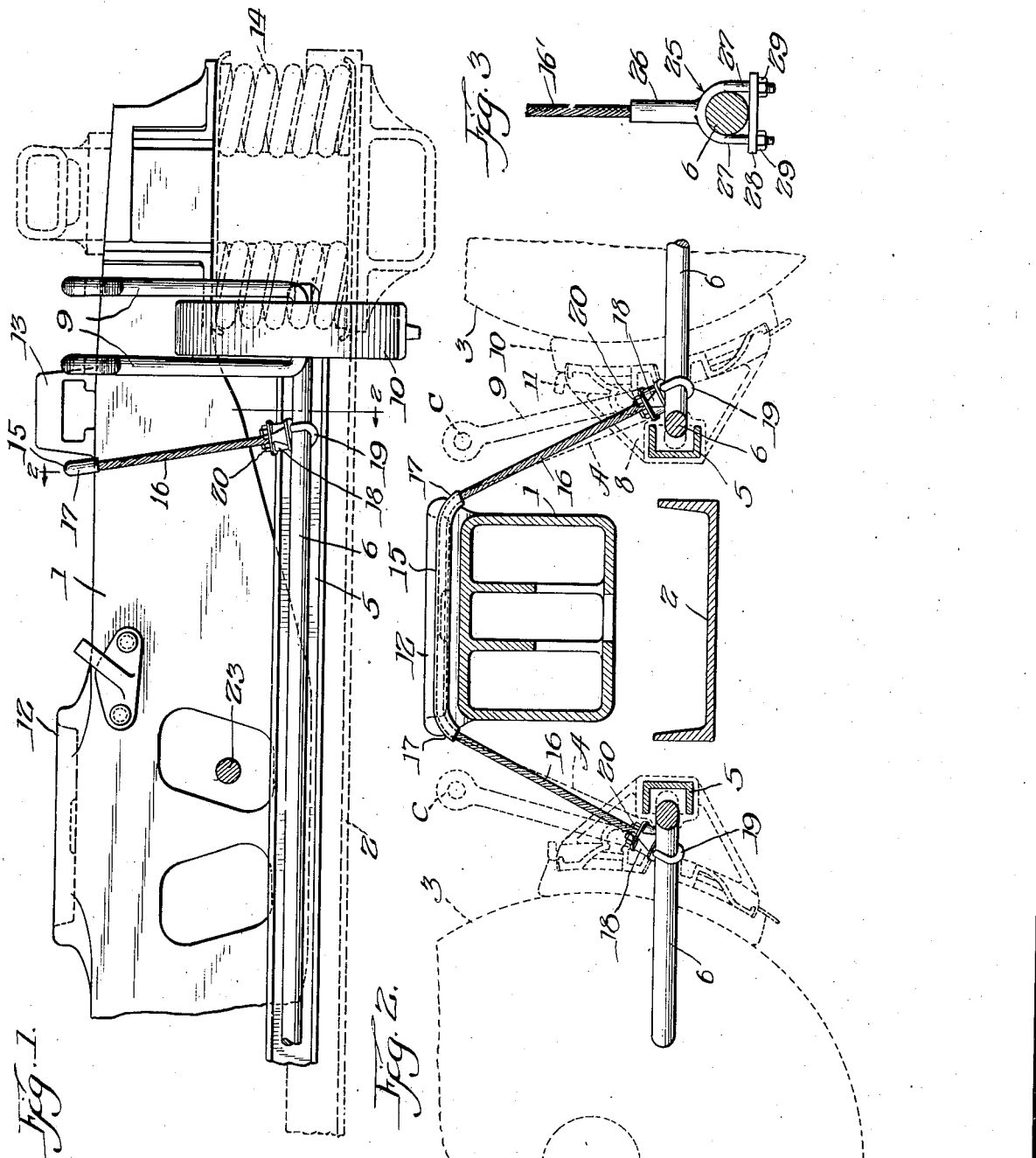

2,335,628

UNITED STATES PATENT OFFICE 2,335,628

BRAKE BEAM SAFETY SUPPORT

Harley E. Anderson, Fort Worth, Tex., assignor to Grip Nut Company, Chicago, Ill., a corporation of Illinois Application October 8, 1941, Serial No. 414,115

13 Claims. (Cl. 188—210)

My invention relates generally to improvements in the brake rigging on railway car trucks, and more particularly to a simple, inexpensive and efficient device adapted to serve as a guard device and emergency support for carrying the brake beams and brake rigging from the bolster in the event of failure of the brake hangers.

The brake beams as generally applied on four wheel trucks, for illustration, lie between the wheels and are suspended from the truck side frames by swinging hangers. The brake beams are connected by the usual brake levers and a connecting rod so that both brake beams will move in unison. In such an arrangement, should there be any failure of the hangers, the rigging would be more or less free to drop down on the tracks, which would obviously be a serious matter if the car was in motion or thereafter put in motion.

My invention has among its objects the production of a safety support of the kind described for brake beams which consists of a minimum of parts, is inexpensive to manufacture, which may be easily applied or removed, is simple in construction, of long life and durable and not subject to wear and tear and which is effective and efficient at all times.

Another object of the invention is to provide a simple means operative to cause the release of the brake shoes from the wheels when the car is standing and for maintaining a clearance between the brake shoe and wheels after the brakes have been released.

A further object is to provide a guard so arranged and spaced above the bolster which will drop down and rest upon the bolster in the event of failure of the brake hangers, so as to support the brake rigging from the bolster to prevent the same from dropping on the tracks.

Another object is the production of a device which is not attached to the bolster and is normally out of engagement therewith except in case of an emergency and which may be constructed in various sizes so as to be suitable for trucks and bolsters of various sizes, and be spaced a predetermined distance above the bolster whereby the amount of drop of the brake rigging in the event of failure of the hangers is not excessive.

Another object is the production of a safety device of the kind described which may be readily and easily installed or removed, and which permits the ready removal and replacement of brake beams, shoes or brake rigging parts.

Many other objects and advantages of the construction herein shown and described will be obvious to those skilled in the art.

To this end my invention consists in the novel construction, arrangement and combination of parts herein shown and described, and more particularly pointed out in the claims.

In the drawing wherein like reference characters indicate like or corresponding parts:

Fig. 1 is a side elevation of my attachment shown applied to a typical truck and brake rigging structure, only a portion of the truck and brake rigging being shown for purposes of illustration;

Fig. 2 is a sectional view taken substantially on line 2—2 of Fig. 1; and

Fig. 3 is a view in elevation of a modified form of fitting.

Referring to the drawing only a portion of a standard four wheel freight car truck is illustrated, and this to show the application of my improved device thereto.

The car truck shown consists of the usual truck bolster 1, spring plank 2, wheels 3, and other parts not necessary to show or describe herein, since they are well known in the art. In some trucks the spring plank is omitted. Only a sufficient portion of the brake rigging to show an installation is shown since my improvement consists in a simple and novel auxiliary support, which is applicable to various types of truck and brake rigging constructions.

The typical brake rigging shown consists of the usual brake beams consisting of compression members 5—5 and tension members 6—6, the usual brake beam struts being omitted from the drawing. I have shown in dotted lines in Fig. 2, the brake beam heads 8, brake beam hangers 9 and brake shoes 10, which shoes are attached to the heads 8 by the keys 11 or equivalent means. The operating levers and rods employed with the brake rigging are not illustrated as these form no part of the present invention, and are well known in the art.

In Fig. 1, the brake beam hanger 9 and a brake shoe 10 are shown in full lines, it not being considered necessary to illustrate how the hangers are supported from the car. The particular bolster 1 illustrated in the drawing is shown provided with a center bearing 12 and with side bearings 13, it being understood that the bolster is supported on the side frames of the truck by the usual springs 14 or other equivalent. In the usual installation there is a brake beam on each side of the bolster, and hangers, brake heads and brake shoes at each end of each beam.

My improved device consists of a cable 16 of the desired length and size, a half inch steel cable of wire strands being suitable. I have found satisfactory a ⅜" steel cable made up of, for example, six strands and a hemp center with seven wires to the strand. Of course, this may be varied as some installations would perhaps require a heavier cable, as for instance on the brake rigging of a locomotive tender. The advantage of this style and type of cable is that the wires are coarse and resist abrasion and corrosion to the greatest extent, but on the other hand, while the rope is somewhat flexible, it is not highly or excessively flexible, and has some resiliency when bent or formed. The cable is preferably galvanized or otherwise treated to resist corrosion, this being particularly desirable when the device is used under refrigerator cars.

A piece of cable of the desired length is provided with suitable fittings at the free ends for attaching the same to a desired part of the brake rigging. In making up the device as shown, a straight piece of cable of the desired size and flexibility is provided with a stiffening member or piece of pipe 15, this being of a size to more or less closely fit the cable. The cable is threaded through the pipe and the ends of the cable and pipe are then formed or bent down as indicated at 17 substantially into U-shape. The special fittings arranged at the two ends of the cable are indicated at 18, in which the ends of the cable are anchored, such as for example by forming a flare within the fitting, bending over the wires at the end of the cable and then seating the ends with zinc or other material within the recess. Each fitting is provided with a U-bolt 19 of a size to embrace the tension rod 6 to which the cable is to be attached. The fittings and pipe are suitably treated to resist corrosion.

In applying the device, the same is applied as shown in the drawing, with one fitting of each cable mounted or secured to the adjacent tension member 6 of the brake beam, the length of the cable being such that when the device is mounted with the intermediate portion above the bolster, it will be spaced from the bolster and not rub thereon. The complete device being supported entirely from the brake beams under normal conditions, should a hanger or other part of the brake rigging fail, the support would immediately drop down to and rest on the top of the bolster and support the brake beam. By employing the pipe reinforcement 15 or its equivalent, the cable is not flexible at its intermediate portion, and consequently retains its U-shape. However, it may flex or swing at the ends as the brake rigging swings on the hangers 9 from the centers C. Normally, when the brakes are released and the brake beams are swung toward the bolster, the cable would flex, as for illustration as indicated by the dotted line A. This is the normal shape. When the brakes are applied and then released, this resiliency or spring in the cable due to its shape, of course, has a tendency to draw the brake shoes away from the wheels, since it exerts a pull on the brake beams. The device, therefore, not only tends to normally pull the brake beams toward the center of the truck and away from the car wheel, but also tends to maintain the beams in horizontal position and the brake shoes in vertical position, thereby preventing the brake beam and its attachments from tilting forward permitting the top of the brake shoes to rub the wheels.

By employing a relatively stiff cable which has its ends attached for support from the brake beams with the intermediate portion of the cable passing over the bolster, and through the use of the pipe reinforcement it is possible to use the shortest length of cable needed to carry out the objects of the present invention. The end portions 16 of the cables will be held in the positions shown in Fig. 2 and are stiff enough to hold the pipe and the pipe sheathed portion of the cable in spaced relation to the bolster as shown. The result is that all flexing of the unsheathed portion of the cable will accommodate brake action and vibration of the associated members.

I have illustrated a modified type of fitting 25 for attaching the cable ends 16' to the brake beam, as shown, to the tension rod. Referring to this figure, 25 represents the fitting which is provided with a tubular shank 26 having a socket for receiving the cable end, and a forked end 27—27. The fitting is arranged on the rod 6 and the same secured in place by the plate 28 and nuts 29. The cable end may be secured in the socket in any suitable manner, for example, by rolling or compressing the shank 26 after the end of the cable is seated in the socket. While the cable ends may be fastened in any suitable manner to the compression member 5, fastening to the rod 6 is somewhat simpler and it permits the use of a slightly longer cable and a wider spacing of the cable ends.

Obviously, being of a floating type, this auxiliary support permits the two brake beams to center themselves between the two opposite wheels by the dead weight of the beams. Therefore, there can be no binding that would prevent the brake shoes from being applied against the wheels. The outer ends of the fittings may be formed to conform to the contour of and closely fit the tension rods 6.

This particular device is not only inexpensive, but is also of light weight, which is of particular advantage in that the weight of the cars and trucks is only slightly increased.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. An auxiliary support for car brake beams consisting of a semi-flexible cable and fittings secured to the ends of the same for attaching said ends to adjacent brake beams, said cable normally being carried solely by the brake beams and of a length to overlie the truck bolster, and means for cooperating with the cable to maintain the portion thereof overlying the truck bolster in spaced parallel relation thereto.

2. A brake beam supporting device of the kind described consisting of a cable provided with a stiffening member intermediate its ends, said stiffening member having downturned ends to provide a U-shaped element, and means for operatively attaching the ends of the cable to a brake beam rigging.

3. A brake beam supporting device of the kind described consisting of a cable provided with a tubular stiffening member enclosing the cable intermediate its ends, said stiffening member having downturned ends to provide a U-shaped element, and means for operatively attaching the ends of the cable to a brake beam rigging.

4. A brake beam supporting device of the kind described consisting of a cable provided with a U-shaped stiffening member intermediate its ends, the cable having its ends depending from the ends of said stiffening member to provide a U-shaped element, and means for operatively attaching the depending ends of the cable to a brake beam rigging and supporting the same thereon.

5. An auxiliary brake beam supporting device of the kind described for railway trucks having a bolster and a pair of brake beams swingingly mounted, one at each side of the bolster, consisting of a semi-flexible resilient cable provided with a fitting at each end for attaching the same to the brake beams, said cable being of a length to extend over the bolster and out of engagement therewith under normal conditions, and guide means carried by the cable to hold the latter out of contact with the edges of the bolster.

6. An auxiliary brake beam supporting device of the kind described for railway trucks having a bolster and a pair of brake beams swingingly mounted, one at each side of the bolster, consisting of a semi-flexible resilient cable provided with a fitting at each end for attaching the same to the brake beams, said cable of a length to extend over the bolster and out of engagement therewith under normal conditions, and a reinforcing stiffening member arranged on the cable at the portion of the same normally overlying and spaced from the bolster when the device is applied to a car.

7. A positioning device for railway car brake beams having a truck bolster therebetween consisting of a woven wire cable having means at the ends for attaching the same at each end to spaced brake beams, the intermediate portion of the cable being reinforced to stiffen that portion of said cable, said portion being normally supported above the bolster from the ends of the cable and shiftable transversely of the bolster with the shifting of the beams as required.

8. A brake beam positioning device of the kind described consisting of a relatively stiff woven wire cable provided with means for attaching the ends thereof to the respective brake beams of adjacent wheels of a car truck, the intermediate portion of the cable between the attached ends when installed being normally supported from said brake beams by said attaching means, and means supported by said cable to prevent the intermediate portion of the cable from looping and to space the same from the car truck.

9. A brake beam positioning device of the kind described for car trucks provided with brake beams, consisting of a relatively stiff wire cable bent in U-shaped formation provided with means for attaching the ends thereof to the respective brake beams of adjacent wheels, and means for sheathing said cable and adapted for maintaining the same in said U-shaped formation, the intermediate portion of the cable between the ends being freely supported from the brake beams by said attaching means when applied to a car truck and in spaced relation to the latter.

10. In a brake rigging of the kind described and in combination, a car bolster, a pair of brake beams swingingly mounted, one on each side of said bolster, and an auxiliary brake beam safety supporting member spaced from and extending over the bolster and connecting said brake beams, said auxiliary member comprising a relatively stiff, but flexible resilient cable, having means at its ends for attaching each end to an adjacent brake beam, the ends of said cable bent down at each side of the bolster, and means for stiffening and retaining the intermediate portion of the cable extending over the bolster against flexing.

11. An auxiliary brake beam supporting device for a railway truck having movably mounted brake beams, comprising a semi-flexible loop, means at the ends of said loop for securing the same to the brake beams and to support the loop in upstanding relation above and over an integral part of said truck, and sheathing means carried by said loop on the intermediate portion thereof and adjacent said integral part of said truck, said sheathing means being shaped substantially to the configuration of said integral part of said truck to minimize the length of said loop and to maintain the latter in a predetermined spaced relation to said integral truck part.

12. An auxiliary brake beam supporting device for a railway truck, the latter including a bolster and movably mounted brake beams adjacent opposite sides of said bolster, comprising a member of limited flexibility, means at the terminal extremities of said member to secure the same to each of said brake beams and to support said member in an upright position with respect to said truck and extending over the bolster, and means connected with the intermediate portion of said member to maintain the same in equal spaced relation with respect to said bolster and at separated points each beyond the brake beam sides of said bolster.

13. An auxiliary brake beam supporting device for a railway truck, the latter including a bolster and movably mounted brake beams adjacent opposite sides of said bolster, comprising a member of limited flexibility, means at the terminal extremities of said member to secure the same to each of said brake beams and to support said member in an upright position with respect to said truck and extending over the bolster, and. rigid sheathing means carried by said member and extending across the top of said bolster and adapted to maintain said member in spaced relation to the bolster, said latter means including curved sections disposed above and outwardly of the lateral edges of the bolster to provide definite flexing points for said limited flexible member located to overhang the edges of said bolster.

HARLEY E. ANDERSON.